United States Patent [19]
Leitner

[11] 3,820,361
[45] June 28, 1974

[54] AUTOMOTIVE ANTI-THEFT DEVICE

[76] Inventor: Erwin M. Leitner, 21-39 45th St., Astoria, N.Y. 11105

[22] Filed: Jan. 26, 1973

[21] Appl. No.: 326,637

[52] U.S. Cl.................... 70/241, 70/257, 180/114, 200/45, 200/61.67, 307/10 AT
[51] Int. Cl...................... E05b 65/19, B60r 25/04
[58] Field of Search............ 70/207, 239, 241, 257, 70/312; 180/114; 200/45, 61.67; 307/10 AT

[56] References Cited
UNITED STATES PATENTS

| | | | |
|---|---|---|---|
| 1,591,777 | 7/1926 | Putman.............................. | 70/185 |
| 1,654,450 | 12/1927 | Blake............................. | 307/10 AT |
| 1,997,050 | 4/1935 | Donovan........................... | 70/241 |
| 3,538,725 | 11/1970 | Guenther et al..................... | 70/241 |
| 3,675,035 | 7/1972 | Brasty............................ | 307/10 AT |

FOREIGN PATENTS OR APPLICATIONS

| | | | |
|---|---|---|---|
| 344,558 | 11/1936 | Italy................................... | 70/241 |

*Primary Examiner*—Albert G. Craig, Jr.
*Attorney, Agent, or Firm*—Breitenfeld & Levine

[57] ABSTRACT

An anti-theft device for an automobile including a support having a slidable rod or latch and a main switch which is open circuited when the rod is caused to extend from the support. The support is connected under the hood of the automobile and the switch is connected in series with the automobile's battery so that when the rod is extended to engage, and thereby lock the hood, the ignition circuit of the automobile is disabled. The position of the rod is controlled by a guided wire connected to a handle for pushing or pulling the rod. The handle is located in a cylindrical housing having tumblers for arresting movement of the handle when the rod is extended and for permitting movement of the handle when the tumblers are in predetermined positions. Thus, if the rod is extended and the tumblers are scrambled, the hood will be locked and the ignition circuit will be disabled until such time as the tumblers are returned to the predetermined positions and the handle is pulled. A current limited reset switch, connected in parallel with the main switch, allows the battery to supply power to the interior lights of the automobile when the main switch is opened but is caused to open if the ignition circuit demands current from the battery. Accordingly, the automobile's interior lights may be used to assist setting the tumblers in the predetermined positions unless the ignition circuit has been tampered with.

14 Claims, 6 Drawing Figures

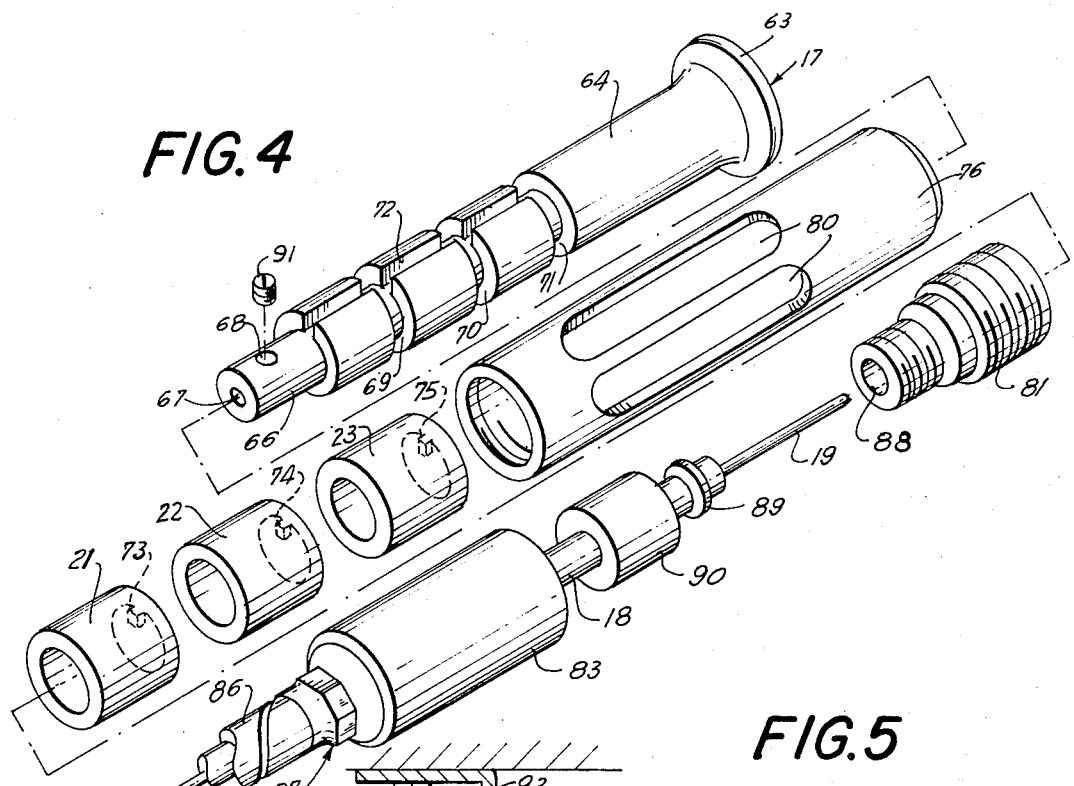

AUTOMOTIVE ANTI-THEFT DEVICE

This invention relates to a device for preventing the theft of accessories under the hood of an automobile, such as its battery, alternator, air conditioner, and carburetor, as well as the theft of the automobile itself.

Automobile owners have been plagued by automobile thieves for years. In some instances, the thieves merely open the hood of a car and walk away with some or all of the engine compartment's contents while in other cases the thieves break into the car, short circuit the car's ignition switch, and drive away. In recent years car manufacturers have installed key actuated steering column locking devices on automobiles to prevent thefts. However, thieves have answered the challenge by using master keys or devices which disable the locks. Once a lock has been disabled, it is a simple matter for a thief to short circuit the car's ignition switch and drive the car away.

Accordingly, it is an object of the present invention to provide an automotive anti-theft device which does not require the use of keys.

It is another object of the present invention to provide an automotive anti-theft device for locking the hood of an automobile and for disabling its ignition circuit so that short circuiting the ignition switch thereof will not start the automobile.

By way of summary, an anti-theft device for an automobile, according to the invention, includes: a housing, a handle slidably coupled to the housing, means for locking the hood of the automobile when the handle is in a first position, means for rendering the ignition system of the automobile inoperative when the handle is in the first position, and a plurality of cylindrical tumblers axially aligned in the housing for arresting the handle in the first position unless the tumblers are in predetermined positions.

The above-mentioned and other objects of this invention will become apparent by reference to the following description in conjunction with the accompanying drawings, in which:

FIG. 4 is an exploded perspective view of means for controlling the position of said rod;

FIG. 5 is a cross-sectional view of means for controlling the position of the rod, the means being coupled by a bracket to the dashboard of the automobile; and FIG. 6 is a schematic diagram showing the switch connected to the automobile's electrical circuitry.

Figure 1:
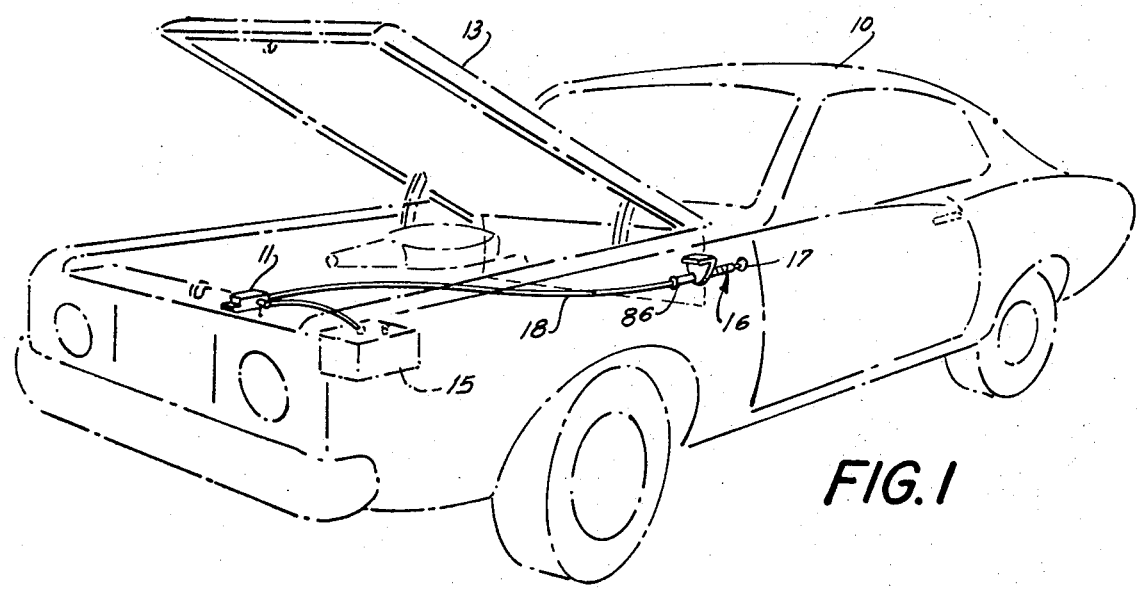
FIG. 1 is a perspective view of an anti-theft device, according to the invention, installed in an automobile.
Figure 2:
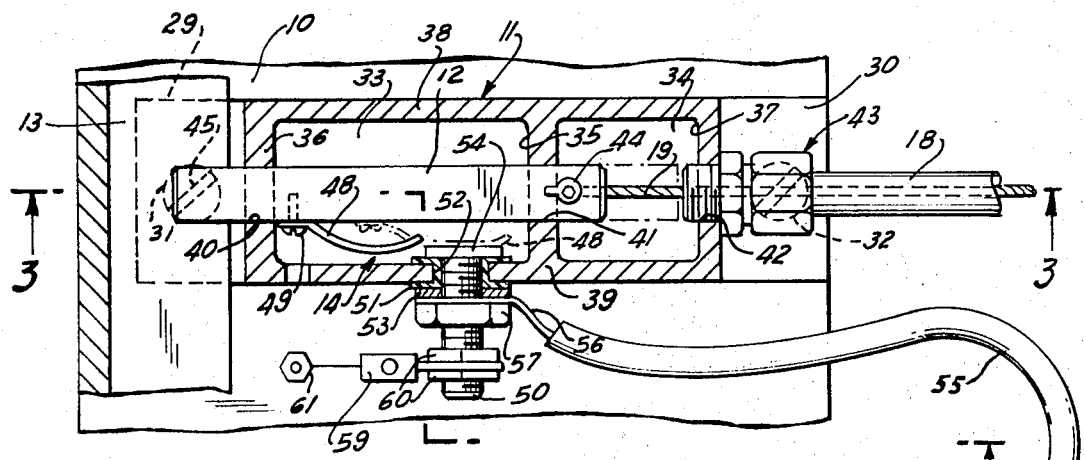
FIG. 2 is a partial top plan view of the installed anti-theft device, a section having been removed from a support to show a slidable rod and a switch of the device, the switch being closed when its contact is positioned as shown by the dotted lines and open when, as shown in solid lines, the rod is extended from the support.
Figure 3:
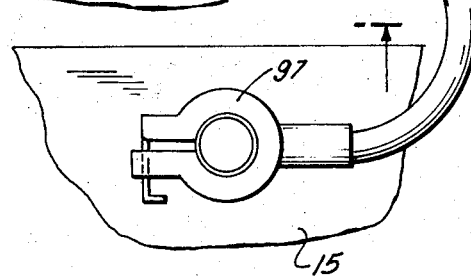
FIG. 3 is a cross-sectional view of the anti-theft device taken along line 3—3 in FIG. 2.
Figure 3:
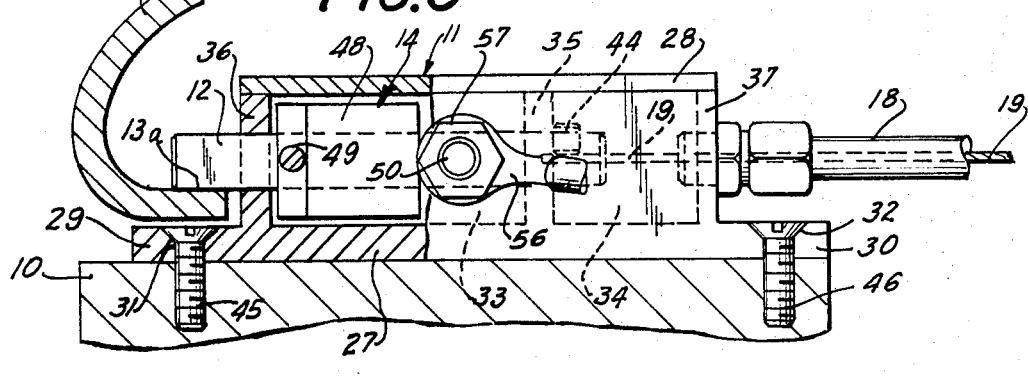

An anti-theft device for protecting an automobile and/or the contents of its engine compartment, chosen to illustrate the invention, is shown connected to an automobile 10 in FIG. 1. Referring to FIGS. 1, 2 and 3, the device includes a support 11 mounted within the engine compartment of the automobile. Within the support 11 there is located a latch, in the form of a rod 12, for engaging the closed hood 13 of the automobile, and a switch 14 connected in series with the automobile's battery 15 for selectively disabling the automobile's ignition system. The rod 12 and switch 14 are controlled, as more fully described below, by a push-pull arrangement comprising (see FIG. 6) a housing 16 mounted under the dashboard of the automobile, a handle 17 slidably coupled to the housing 16, a cable 18 coupling the housing 16 to the support 11, and a slidable wire 19 within the cable 18 coupling the handle 17 to the rod 12 and hence switch 14. With this arrangement, when the hood is closed and the handle 16 is in a first or pushed-in position, the rod 12 is extended so as to engage the hood 13 and the switch 14 is open so as to disable the ignition system, as shown in solid lines in FIG. 2. Under these circumstances, the hood 13 cannot be opened and the automobile's engine cannot be started. When the handle 17 is moved to a second or pulled out position, the rod 12 is withdrawn out of engagement with the hood 13 and the switch 14 is closed, as shown in dotted lines in FIG. 2, to enable the ignition system. Thereafter, the hood 13 may be opened, if desired, and the automobile's engine may be started.

Referring to FIG. 5, the housing 16 supports tumblers 21, 22, 23 which when aligned in predetermined positions, do not interfere with the movement of the handle 17. However, as more fully described below, when the handle 17 is in the first or pushed in position, as shown in FIG. 5, the tumblers 21, 22, 23 may be moved away from the predetermined positions to prevent outward movement of the handle, thereby keeping the closed hood 13 locked and the switch 14 open. The hood will remain locked and the switch will remain open until such time as a person moves the tumblers 21, 22, 23 to the predetermined positions and pulls the handle 17 out, as indicated by the arrow 24, into its second position. Hence, knowledge of the predetermined positions of the tumblers is required in order to render an automobile protected by the device operative.

Referring to FIGS. 2 and 3, support 11 includes a base 27 and a cover 28. The base 27 is substantially rectangular and includes a pair of end extensions 29 and 30 having holes 31 and 32, respectively; and a pair of rectangular cavities 33 and 34 defined by a wall 35 between the cavities, transverse end walls 36 and 37, and longitudinal side walls 38 and 39. The walls 36 and 35 include holes 40 and 41, respectively, for slidably supporting the rod 12, and wall 37 includes a hole 42 which, via a cable coupling 43, supports an end of the cable 18. The holes 40, 41, 42 have a common longitudinal axis. The slidable wire 19 of the cable 18 is connected by a set screw 44 to the rod 12. Thus, when the slidable wire 19 is moved, the rod 12 follows. Screws 45 and 46 pass through holes 31 and 32, respectively, to secure the base 27 to the automobile 10 in a position such that if the rod 12 is extended when the hood is closed, the end of the rod will be in the path of travel of an inturned portion 13a of the hood 13 (see FIG. 3) or, if otherwise desired, a member secured to and projecting inwardly from the hood. The rod 12 is long enough so that when it is extended it remains in contact with holes 40 and 41. Accordingly, if an attempt to lift the hood 13 is made, the torque applied to the rod 12 by the hood is resisted by the secured base, and the hood remains closed. Alternatively, if the rod is withdrawn, as shown by the dotted lines in FIG. 2, the hood 13 may be opened or closed at will.

Switch 14 includes a resilient contact 48, connected to the rod 12 within cavity 33 by a screw 49, and a stationary terminal 54, extending into the cavity 33, defined by the head of a bolt 50. Bolt 50 is supported by an electrical insulator 51 mounted in a hole 52 in wall 39 of support 11, and is secured to the insulator 51 by a nut 57. Resilient contact 48 and terminal 54 are mounted such that when the rod 12 is extended the switch 14 is open circuited and when the rod is withdrawn, the switch 14 is closed. The ground cable 55 of the battery 15 includes a lug 56 on its end which is secured to the bolt 50 by nut 57, a washer 53 being arranged between lug 56 and insulator 51. In this example, the rod 12, base 27, and screws 45 and 46 are metallic. Accordingly, when switch 14 is closed, the battery 15 is grounded to the automobile chassis, and when the switch 14 is open circuited, the battery 15 is ungrounded. As more fully described below, when the battery 15 is ungrounded the automobile's ignition circuits are rendered inoperative, but a current limited reset switch 59, connected between the terminal 50 and chassis by screws 60 and 61, permits current to flow to other electrical circuits of the automobile 10.

Referring to FIGS. 4 and 5, handle 17 is a unitary cylindrical member comprising: a knob 63, a neck portion 64 having a longitudinal groove 65, a reduced diameter end portion 66 having an axially extending hole 67 and a radially extending threaded hole 68, three equally spaced circumferential annular grooves 69, 70, 71, and a keyway 72 extending longitudinally along the surface of the handle from the end portion 66 to the groove 71. Tumblers 21, 22, 23 are hollow cylindrical elements each having a length which is slightly less than the spacing between the reduced diameter portion 66 and annular grooves 69, 70, and 71, respectively. The tumblers include, respectively, keys 73, 74, 75 extending radially inwardly for engagements within grooves 69, 70 and 71 of the handle 17 within the housing 16.

Housing 16 consists of two cylindrical sections 76 and 83. Section 76 has an axial bore 77 adapted to slidably support the neck 64 of the handle; an axial bore 78 which communicates with the bore 77 at one end and includes a thread 79 at its other end, and longitudinal slots 80 extending from the surface of the section into bore 78. Tumblers 21, 22, 23 are rotatably supported in bore 78 and are axially retained in abutment (see FIG. 5) by a shoulder between bores 77 and 78 and by a threaded member 81 coupled to thread 79. Threaded member 81 has a bore 82 adapted to slidably engage end portion 66 of handle 17, and tumblers 21, 22, 23 are located within section 76. When the handle 17 is within the section 76 keys 73, 74, 75 engage, respectively, annular grooves 69, 70, 71 or keyway 72. After the handle 17 and section 76 have been assembled, part of the section 76 is punched to provide a raised portion 84 irreversibly slidably engaged with the longitudinal groove 65 in handle 17. The engagement prevents rotation of the handle 17 with respect to housing section 76 and, when the keys 73, 74, 75 are aligned with the keyway 72, limits axial motion of handle 17 between a first or pushed in position wherein the end portion 66 fully extends into the bore 82 (see FIG. 5) and a second or pulled out position wherein the raised portion abuts an end 95 of the groove 65. Alternatively, if any one or more of the keys 73, 74, 75 of tumblers 21, 22 and 23 are out of alignment with the keyway 72, the handle 17 will be locked against axial movement. Since the keys 73, 74, 75 extend inwardly and are not visible through the slots 80, indicia (not shown) are located on the surface of the section 76 and tumblers 21, 22, 23 to enable, by rotation of the tumblers, the alignment of the keys 73, 74, 75 with the keyway 72. The indicia may be varied from device to device. Under such circumstances, knowledge of how the indicia should be aligned so as to align keys 73, 74, and 75 with keyway 72 and thereby permit movement of the handle 17 would be required by one who desires to open the hood 13 or enable the automobile's ignition system.

Section 83 includes an internally threaded end by which it is connected to the threaded member 81 and includes a hole 85 to which a flexible metallic tube 86 is connected by a coupling 87. The flexible tube 86 is adapted at its other end (not shown) so that it may be attached to the fire wall of the automobile 10. Cable 18 runs within the tube 86 and extends into section 83. Thus, the section of the cable 18 running within the passenger compartment of the automobile is protected by the metal tube 86. Within section 83 cable 18 extends into a bore 88 in the threaded member 81 and is secured thereto by a ferrule 89 and a cup 90 threadably connected to the threaded member 81 so as to compress the ferrule and secure the cable. Slidable wire 19 extends from the cable 18, through the bore 88, and into hole 67, within handle 17, wherein it is secured by a set screw 91 extending through hole 68. Thus, when the handle 17 is pushed or pulled the slidable wire 19 is caused to follow and, consequently, the rod 12 follows the motion of the handle.

Before the sections 76 and 83 are screwed on to the threaded member 81, a bracket 92 is located between the ends of the threaded member 81. As a result, when the housing is assembled the sections 76 and 83 sandwich the bracket 92 between them. After the sections 76 and 83 have been coupled to each other and the bracket 92, pins 93 and 94 are driven through sections 76 and 83, respectively, into the threaded member 81. As a result, the sections 76 and 83, the bracket 92, and the threaded member 81 will be permanently fixed to each other. Although not shown, as an alternative, the bracket 92 and sections 76 and 83 may be welded together. With either of these fastenings, the anti-theft device will not yield to common burglars tools. Bracket 92 may be secured beneath the automobile dashboard 105 by a screw 106.

Referring to FIG. 6, as is typical with automobile ignition systems, the positive terminal 96 of the battery 15 is connected in series with an ignition switch 98, an ignition coil 100, a distributor 101, sparkplugs 102, and ground. The positive terminal 96 and the ignition switch 98 are also in series with a starter 99 and ground, the starter being in parallel with the coil, the distributor and the sparkplugs. In addition, battery terminal 96 is connected in series with a light switch 103 and the interior lights 104 of an automobile to ground.

According to the invention, the negative terminal of the battery 15 is connected to ground via the switch 14 and the reset switch 59. With this arrangement, if the switch 14 is open as would be the case when the rod 12 is extended, the battery 15 can supply current to the other circuits of the automobile, e.g., the lights 104, via the reset switch 59. However, if the ignition switch 98 is thrown, the current drawn from the battery exceeds that which the reset switch 59 can carry and the reset switch 59 automatically opens. Under these circumstances, all of the electrical systems of the automobile are rendered inoperative. Thus, the interior lights 104 may be used to set the tumblers 21, 22, 23 in predetermined positions to enable handle 17 to be pulled out and hence normal operation of the ignition system, i.e., when switch 14 is closed. But, if the switch 14 is open, the first attempt to start the automobile causes the lights to go out. As a result, one tampering with the anti-theft device would be further hindered by the absence of light from the lights 104. Although the reset switch 59 may be concealed within the passenger compartment of the automobile, locating it, as shown in FIG. 2, within the engine compartment prevents its being reactivated by one tampering with the anti-theft device.

From all of the foregoing it may be seen that the positions of the tumblers 21, 22, 23 determine whether or not the handle 17 may be moved to control the position of rod 12 and switch 14, and that the position of the handle 17 with respect to the housing 16 determines whether or not the hood 13 may be opened and the automobile started. Since the tumblers 21, 22, 23 can only be positioned for operation of the handle by one having knowledge of a combination, the automobile 10 is protected from thieves or unauthorized persons.

Since once the invention is understood modification of the structure described may be readily apparent to those skilled in the art, it is to be understood that the description herein of a preferred embodiment, according to the invention, is set forth as an example thereof and is not to be construed or interpreted as a limitation on the claims which follow and define the invention. For example, the cylindrical sections of the handle which define the keyway 72 can be modified to include slots (not shown) which are slidably engageable with the keys 73–75 and are parallel to the keyway 72 but do not extend from one of the annular grooves 69–71 to another of the annular grooves 69–71. With this arrangement the keys 73–75 can be aligned with the slots but since the slots do not extend between the grooves, the handle cannot be pulled out to open the lock. Functionally, the slots serve as decoys which prevent the opening of the lock by one who rotates the tumblers to feel for an engagement between the keys 73–75 and the keyway 72.

What is claimed is:

1. An anti-theft device for an automobile, comprising:
   a. a housing,
   b. a handle slidably coupled to the housing for movement between a first position and a second position,
   c. means for locking the hood of the automobile when the handle is in the first position and for unlocking the hood when the handle is in the second position, said locking means including a metallic latch rod slidably coupled to the automobile, the latch rod when in an extended position preventing relative movement between the hood and the body of the automobile, the latch rod forming an essential part of the electrical ignition circuit of the automobile, said circuit being broken when the latch rod is in said extended position,
   d. means coupling the handle to the latch rod so that when the handle is in the first position the rod is in its extended position, and
   e. locking means associated with said housing for preventing movement of the handle from its first position to its second position unless the locking means is deactivated.

2. An anti-theft device as defined in claim 1 wherein said locking means includes a plurality of tumblers axially aligned in the housing.

3. An anti-theft device as defined in claim 2 wherein the housing includes at least one slot providing access to the tumblers, and further including means for indicating when the tumblers are in the predetermined positions.

4. An anti-theft device as defined in claim 2 wherein the handle includes a plurality of annular grooves and a longitudinal keyway, and wherein at least one of the tumblers includes a key, said handle being axially slidable when the keys are all aligned with the keyway and prevented from moving when at least one of the keys is engaged with a groove but out of alignment with the keyway.

5. An anti-theft device as defined in claim 4 wherein each of the tumblers is a hollow cylinder rotatably supported in the housing, the key of each tumbler extending towards the longitudinal axis of the housing; and said handle extends through the hollow part of the tumblers.

6. An anti-theft device as defined in claim 1 wherein said means coupling the handle to the latch rod includes a cable coupled at one end to the housing and at the other end to the support; and a slidable wire within the cable, said wire being coupled at one end to the handle and at the other end to the latch rod.

7. An anti-theft device as defined in claim 1 further including means for rendering the ignition system of the automobile inoperative when the handle is in the first position and for rendering the ignition system operative when the handle is in the second position.

8. An anti-theft device as defined in claim 7 wherein said means for rendering the ignition system inoperative includes a main switch coupled to the handle, said switch being in an open position when the handle is in the first position, whereby when the switch is connected in series with the battery of the ignition system and the handle is in the first position the ignition circuit is inoperative.

9. An anti-theft device as defined in claim 8 wherein said main switch is coupled to the handle by a flexible wire.

10. An anti-theft device as defined in claim 1 including a metallic support for attachment to the automobile, said latch rod being slidable in said support, said support forming part of the electrical ignition circuit of the automobile when the device is connected to the automobile battery.

11. An anti-theft device as defined in claim 10 wherein said means for rendering the ignition system inoperative includes an electrical contact coupled to the rod, an insulator supported by the metallic support, a terminal connected to the insulator, said contact and terminal being disconnected when the rod is in the extended position, whereby when the contact and terminal are connected in series with the battery of the automobile and the rod is in the extended position the automobile's ignition system will be inoperative.

12. An anti-theft device as defined in claim 11 wherein said means for rendering the ignition system inoperative includes a current sensitive reset switch electrically coupled at one end to the terminal and at the other end to the electrical contact.

13. An anti-theft device as defined in claim 1 including a switch contact carried by and movable with said latch rod, said switch contact forming part of a switch which forms part of the electrical ignition circuit of the automobile when the device is connected to the automobile battery.

14. An anti-theft device for an automobile, comprising:
 a. a housing,
 b. a handle slidably coupled to the housing for movement between a first position and a second position,
 c. means for locking the hood of the automobile when the handle is in the first position and for unlocking the hood when the handle is in the second position,
 d. means for rendering the ignition system of the automobile inoperative when the handle is in the first position and for rendering the ignition system operative when the handle is in the second position, said means for rendering the ignition system inoperative including a main switch coupled to the handle, said switch being in an open position when the handle is in the first position, whereby when the switch is connected in series with the battery of the ignition system and the handle is in the first position the ignition circuit is inoperative, and
 e. a current sensitive reset switch connected in parallel with the main switch, whereby when the main switch is connected in series with the battery of the ignition system and is open circuited, current drawn by the ignition system causes the reset switch to open and the battery is disconnected from all of the automobile's electrical circuits.

* * * * *